Patented Apr. 3, 1945

2,372,797

UNITED STATES PATENT OFFICE 2,372,797

CONDENSATION PRODUCTS

Ernest Segessemann, Newark, and William L. Abramowitz, Lakewood, N. J., assignors to National Oil Products Company, Harrison, N. J., a corporation of New Jersey No Drawing. Application January 26, 1940,
Serial No. 315,743

10 Claims. (Cl. 260—404)

This invention relates to the preparation of novel condensation products.

As is well known, a large number of surface active agents have been prepared from fatty acids containing up to about 18 carbon atoms, or derivatives thereof, but the surface active properties of such substances could still be improved upon with advantage. It has been suggested that surface active agents could be prepared from fatty substances having higher molecular weights than those now used, which agents should possess valuable properties. However, one of the chief difficulties in the manufacture of surface active agents of higher molecular weight than those now on the market has been that starting materials for the manufacture of such agents have not been readily available. Moreover, an increase in the molecular weight of surface active agents generally produces a corresponding decrease in the hydrophilic properties of these agents; this is disadvantageous because it is important that surface active agents possess hydrophilic properties so that they may be employed in conjunction with aqueous materials.

It is an object of this invention to provide organic substances having higher molecular weights than the present commercial surface active agents and possessing pronounced surface activity and hydrophilic characteristics.

In accordance with our invention, condensation products are prepared which are obtainable by reacting a substance selected from the group consisting of aliphatic hydroxy monocarboxylic acids containing at least 6 carbon atoms, and esters, acid halides and anhydrides thereof, a substance selected from the group consisting of non-hydroxy monocarboxylic acids containing from 6 to 22 carbon atoms, and esters, acid halides and anhydrides thereof, and a nitrogen-containing compound selected from the group consisting of organic amines containing not more than 22 carbon atoms, and containing at least one amino hydrogen atom at temperatures above about 100° C., preferably between about 150° C. and about 260° C. Our novel condensation products are preferably prepared by first reacting an aliphatic hydroxy monocarboxylic acid containing at least 6 carbon atoms, or one of the above-mentioned derivatives thereof, with a non-hydroxy monocarboxylic acid containing from 6 to 22 carbon atoms, or one of the above-mentioned derivatives thereof, and then treating the resulting product with a nitrogen-containing compound selected from the above group, both reactions being carried out at temperatures above about 100° C., preferably between about 150° and and about 260° C. However, these condensation products may be prepared by first reacting an aliphatic hydroxy monocarboxylic acid, or one of its above-mentioned derivatives, with a nitrogen-containing compound selected from the above group, and then treating the resulting product with a non-hydroxy monocarboxylic acid containing from 6 to 22 carbon atoms, or a suitable derivative thereof, the reaction temperatures being above about 100° C.; furthermore, these products may be prepared by mixing the above reaction ingredients and heating the mixture to above about 100° C. Our condensation products are unique in that they possess extremely high molecular weights, are completely compatible with oils and fats, and yet have excellent surface active properties. Products of our invention prepared as above described employing a polyamine as the nitrogen-containing compound may be solubilized by treatment with acids and the solubilized modifications employed for a wide variety of purposes. All the products of our invention have many valuable industrial uses, as will more fully appear from the detailed description hereinafter given.

In carrying out the preparation of the novel products of our invention, one of the reaction ingredients is a substance selected from the group consisting of aliphatic hydroxy monocarboxylic acids containing at least 6 carbon atoms, and esters, acid halides and anhydrides thereof, the particular substance used depending to a large extent upon the type of product desired. Among the compounds we prefer to employ are ricinoleic acid, castor oil, 12-hydroxy stearic acid, hydrogenated castor oil and ricinoleyl chloride. However, substances such as hexanol-4-carboxylic acid-1, nonanol-7-carboxylic acid-1, koeme oil, hydroxylated oils, fats or fatty acids obtained by blowing unsaturated oils, fats or fatty acids or by any other suitable method, sabinic acid, etc., may be used.

Another of the reaction ingredients employed in the preparation of our novel products is a substance selected from the group consisting of non-hydroxy monocarboxylic acids containing from 6 to 22 carbon atoms, and esters, halides and anhydrides thereof. We prefer to employ fatty acids such as coconut fatty acids, lauric acid, oleic acid, stearic acid, undecylic acid, caproic acid, caprylic acid, capric acid, or mixtures thereof, since these acids are readily available and since condensation products obtained from such acids in accordance with our invention possess excellent properties. However, other monocarboxylic acids containing from 6 to 22 carbon atoms, such as, for example, benzoic acid, erucic acid, naphthoic acid, naphthenic acids, abietic acid, nicotinic acid, etc. may be employed. Esters, acid halides and anhydrides of such acids, such as, for example, coconut oil, methyl oleate, ethyl stearate, stearyl chloride and caprylic anhydride may be utilized.

The nitrogen-containing reaction ingredient employed in accordance with our invention may be an organic amine containing not more than 22 carbon atoms and containing an amino hydrogen atom. We prefer to employ relatively low molecular weight aliphatic amines containing between 2 and 8 carbon atoms, such as monoethanolamine, diethanolamine, monoisopropanolamine, ethylene diamine, diethylene triamine, ethanol ethylene diamine, tetraethylene pentamine, iso-butyl amine and the like; the lower polyamines are particularly useful in the practice of our invention, since they yield products which are hydrophilic and which may be solubilized by treatment with acids such as acetic acid or lactic acid. However, other nitrogen-containing compounds selected from the above groups may be used, such as, for example, octyl amine, stearyl amine, aniline, cyclohexylamine, degraded proteins, urea, thiourea, N-methyl urea, N-methyl thiourea or ammonia.

The novel condensation products of our invention are preferably prepared by causing an aliphatic hydroxy monocarboxylic acid containing at least 6 carbon atoms, or an ester, acid halide or anhydride thereof, to react with non-hydroxy monocarboxylic acid containing from 6 to 22 carbon atoms, or an ester, acid halide or anhydride thereof, and then treating the resulting product with a nitrogen-containing compound selected from the group above defined. When carrying out the first step of this preferred synthesis, varying amounts of the reaction ingredients may be employed, the particular amounts depending upon the type of the product it is desired to obtain and upon the nature of the reacting ingredients. Generally it may be stated that when the ingredients employed are both free fatty acids, between about ⅓ mole and about 1 mole of the non-hydroxy monocarboxylic acid containing from 6 to 22 carbon atoms may be employed for every mole of aliphatic hydroxy monocarboxylic acid. If reaction ingredients other than free fatty acids are employed in the practice of our preferred synthesis, the relative amounts thereof may have to be varied in accordance with stoichiometric principles in order to obtain the same products; for example, if a non-hydroxy monocarboxylic acid containing from 6 to 22 carbon atoms is to be reacted with a glyceride of an aliphatic hydroxy monocarboxylic acid, the amount of the non-hydroxy monocarboxylic acid employed should be between about 1 and about 3 moles per mole of glyceride. The reaction may be carried out by heating the mixture at a temperature above about 100° C., preferably at a temperature between about 150° and about 260° C., for between about 1 and about 10 hours at any desired pressure.

When the reaction involved in the first step of our preferred synthesis is complete, the reaction mixture may then be mixed with a suitable amount of the nitrogen-containing compound and the second step of our preferred synthesis carried out. The amount of nitrogen-containing compound incorporated in the reaction mixture may likewise vary widely depending chiefly upon the number of radicals present in the reaction mixture capable of reacting therewith. Thus if free fatty acids were employed in the first step of the preferred synthesis, between about ⅓ and about 1 mole of the nitrogen-containing compound per mole of hydroxy acid employed is suitable. In case a glyceride of the hydroxy acid was employed, the amount of nitrogen-containing compound should be increased about threefold. This reaction may be carried out by heating the mixture at a temperature above about 100° C., preferably between about 150° C., and about 260° C., for a suitable time, e. g., 3 to 20 hours; if desired, sub-atmospheric pressure may be employed in carrying out this reaction. When this reaction is complete, the mass may be permitted to cool, whereby the desired condensation product is obtained.

As above stated, other processes may be employed for the preparation of the condensation products of our invention; thus, for example, a nitrogen-containing compound selected from the group above defined may be reacted with an aliphatic hydroxy monocarboxylic acid containing at least 6 carbon atoms, or a suitable derivative thereof, and this reaction product then condensed with a non-hydroxy monocarboxylic acid containing from 6 to 22 carbon atoms, or one of the above-mentioned derivatives of such acids. In carrying out this procedure, the mixture of the nitrogen-containing compound and the hydroxy acid may be heated at a temperature above 100° C., preferably between about 150° C. and about 260° C., for 3 hours or more at any desired pressure. This product may then be mixed with a non-hydroxy monocarboxylic acid containing from 6 to 22 carbon atoms, or a suitable derivative thereof, and the mixture heated to a temperature between about 150° C. and about 260° C. for from 1 to 10 hours, whereby the desired product is obtained. Furthermore, suitable amounts of all the reaction ingredients may be mixed together and the mixture heated at a temperature above about 100° C., preferably between about 150° C. and about 260° C., for a suitable time until the desired products are obtained.

The condensation products of our invention possess very high molecular weights and are completely compatible with oils and fats. These products ordinarily have colors which may vary from light-amber to light-brown; they may be solid or liquid depending upon the nature of the reaction ingredients employed and upon the method of preparation. Our novel products may be employed as defoamers; as textile lubricants and softeners; for fat-liquoring, waterproofing and softening leather; as plasticizers and softeners; as de-emulsifying agents; and as flotation agents. The solid products may be employed as wax substitutes. The products of our invention may be treated with sulfating, phosphating or borating agents, whereby sulfated, phosphated or borated products are obtained which possess surface active properties and which may serve as wetting, dispersing and emulsifying agents or as assistants in the dyeing of textiles.

The reactions which take place during the preparation of our novel condensation products are extremely complicated and hence it is impossible to assign definite formulae to our products. We believe that the condensation products obtained by the practice of our invention comprise chiefly amides of the aliphatic hydroxy monocarboxylic acids in which the hydroxyl groups of the acids are esterified by the non-hydroxy monocarboxylic acids containing from 6 to 22 carbon atoms. This belief is confirmed somewhat by the properties possessed by our novel condensation products. However, it is to be understood that we have not been able to definitely ascertain the chemical nature of our condensation products, and hence do not wish to be confined to any particular theory with regard to their constitution.

The following examples are illustrative of our invention; amounts are given in parts by weight.

Example I 250 parts of castor oil were mixed with 167 parts of coconut fatty acids and this mixture was then heated at 220° C. for 6½ hours. 200 parts of the reaction product were then mixed with 24 parts of monoethanolamine and the mixture heated at 150° C. for 4 hours. The resulting product was a light-brown solid.

Example II 500 parts of castor oil and 334 parts of coconut fatty acids were mixed and the mixture heated at 250° C. for 4½ hours. 400 parts of the reaction product were mixed with 40 parts of diethylene triamine and the mixture heated at temperatures between 150° C. and 170° C. for 6 hours. The product was a brown solid, soluble in acids and dispersible in water.

Example III 150 parts of abietic acid and 150 parts of castor fatty acids were mixed and the mixture heated at 250° C. for 4 hours. 100 parts of the resulting product and 10 parts of monoethanolamine were then mixed and the mixture heated at a temperature of 150° C. for 9 hours. The resulting product was a brown solid.

Example IV 704 parts of hydrogenated castor oil having an iodine value of about 20 and 634 parts of oleic acid were mixed, and the mixture heated at temperatures between 220° C. and 250° C. for 5 hours. 150 parts of the resulting product were then mixed with 13 parts of diethylene triamine and the mixture heated at 170° C. for 6 hours. The resulting product was a dark brown, soft solid.

Example V 700 parts of castor oil and 639 parts of stearic acid were mixed and the mixture heated at temperatures between 210° C. and 230° C. for 4 hours. 384 parts of the resulting product were then mixed with 34 parts of diethylene triamine and the mixture heated at 170° C. for 6 hours. The resulting product was a brown, soft solid.

Example VI 704 parts of hydrogenated castor oil having an iodine value of about 20 and 634 parts of oleic acid were mixed, and the mixture heated at temperatures between 220° C. and 250° C. for 5 hours. 425 parts of the resulting product were then mixed with 75 parts of ethanol ethylene diamine and the mixture heated at temperatures between 150° C. and 170° C. for 6 hours. The resulting product was a dark brown, soft solid.

Example VII 500 parts of castor oil and 100 parts of monoethanolamine were mixed and the mixture heated at 100° C. for 7 hours and then at 125° C. for 10 hours. 172 parts of the resulting product were then mixed with 110 parts of coconut fatty acids and the mixture heated at temperatures between 150° C. and 170° C. for 24 hours. The resulting product was a liquid.

It will be evident from the above description that our invention provides novel condensation products of high molecular weight, many of which possess hydrophilic characteristics; therefore, our invention will be of great interest to those engaged in the preparation of surface active agents and other synthetic organic derivatives.

Since certain changes in carrying out the above process and certain modifications in the compositions which embody the invention may be made without departing from its scope, it is intended that all matter contained in the above description be interpreted as illustrative and not in a limiting sense.

Having described our invention, what we claim as new and desire to secure by Letters Patent is:

1. An amide of an aliphatic hydroxy monocarboxylic acid containing at least 6 carbon atoms, in which the hydroxyl group is esterified with a non-hydroxy monocarboxylic acid containing from 6 to 22 carbon atoms and in which the carboxyl group is amidified with an organic amine chosen from the group consisting of aliphatic amines and polyamines, said organic amine containing between 2 and 8 carbon atoms and at least one amino hydrogen atom.

2. An amide of an aliphatic hydroxy monocarboxylic acid containing at least 6 carbon atoms in which the hydroxyl group is esterified with a non-hydroxy monocarboxylic acid containing from 6 to 22 carbon atoms and in which the carboxyl group is amidified with a polyamine, said polyamine containing between 2 and 8 carbon atoms and at least one amino hydrogen atom.

3. An amide of the fatty acids of castor oil in which the hydroxyl groups are esterified with a non-hydroxy monocarboxylic acid containing from 6 to 22 carbon atoms and in which the carboxyl groups are amidified with an organic amine chosen from the group consisting of aliphatic amines and polyamines, said organic amine containing between 2 and 8 carbon atoms and at least one amino hydrogen atom.

4. An amide of an aliphatic hydroxy monocarboxylic acid containing at least 6 carbon atoms in which the hydroxyl group is esterified with a stearic acid and in which the carboxyl group is amidified with an organic amine chosen from the group consisting of aliphatic amines and polyamines, said organic amine containing between 2 and 8 carbon atoms and at least one amino hydrogen atom.

5. An amide of an aliphatic hydroxy monocarboxylic acid containing at least 6 carbon atoms in which the hydroxyl group is esterified with coconut oil fatty acids and in which the carboxyl group is amidified with an organic amine chosen from the group consisting of aliphatic amines and polyamines, said organic amine containing between 2 and 8 carbon atoms and at least one amino hydrogen atom.

6. An amide of an aliphatic hydroxy monocarboxylic acid containing at least 6 carbon atoms in which the hydroxyl group is esterified with oleic acid and in which the carboxyl group is amidified with an organic amine chosen from the group consisting of aliphatic amines and polyamines, said organic amine containing between 2 and 8 carbon atoms and at least one amino hydrogen atom.

7. A process for the preparation of novel condensation products, which comprises reacting a substance selected from the group consisting of aliphatic hydroxy monocarboxylic acids containing at least 6 carbon atoms, and esters, acid halides and anhydrides thereof, with a substance selected from the group consisting of non-hydroxy monocarboxylic acids containing from 6 to 22 carbon atoms, and esters, acid halides and anhydrides thereof, and then reacting the resulting product with an organic amine selected from the group consisting of aliphatic amines and polyamines, said organic amine containing at least one amino hydrogen atom, at a temperature between 150° C. and 260° C.

8. A process for the preparation of novel condensation products, which comprises reacting a substance selected from the group consisting of aliphatic hydroxy monocarboxylic acids containing at least 6 carbon atoms, and esters, acid halides and anhydrides thereof, with a substance selected from the group consisting of non-hydroxy monocarboxylic acids containing from 6 to 22 carbon atoms, and esters, acid halides and anhydrides thereof, at a temperature between 150° C. and 260° C. and then reacting the resulting product with an organic amine containing not more than 22 carbon atoms and selected from the group consisting of aliphatic amines and polyamines, said organic amine containing at least one amino hydrogen atom, at a temperature between 150° C. and 260° C.

9. A process for the preparation of novel condensation products, which comprises reacting a substance selected from the group consisting of aliphatic hydroxy monocarboxylic acids containing at least 6 carbon atoms, and esters, acid halides and anhydrides thereof, with a substance selected from the group consisting of non-hydroxy monocarboxylic acids containing from 6 to 22 carbon atoms, and esters, acid halides and anhydrides thereof, at a temperature between 150° C. and 260° C. and then reacting the resulting product with an aliphatic amine containing at least one amino hydrogen atom and containing from 2 to 8 carbon atoms, at a temperature between 150° C. and 260° C.

10. A process for the preparation of novel condensation products, which comprises reacting castor oil with a non-hydroxy fatty acid containing from 6 to 22 carbon atoms at a temperature between 150° C. and 260° C. and then reacting the resulting product with an aliphatic polyamine containing at least one amino hydrogen atom and containing from 2 to 8 carbon atoms, at a temperature between 150° C. and 260° C.

ERNEST SEGESSEMANN.
WILLIAM L. ABRAMOWITZ.